3,265,694
OXYALKYLATED ISOCYANURIC ACID

Wilhelm E. Walles, Midland, and James J. Davies, Mount Pleasant, Mich., assignors to The Dow Chemical Company, a corporation of Michigan
No Drawing. Original application July 25, 1960, Ser. No. 44,893. Divided and this application Oct. 14, 1963, Ser. No. 334,681
5 Claims. (Cl. 260—248)

This application is a division of copending application, Serial No. 44,893, filed July 25, 1960.

This invention relates to the oxyalkylation of isocyanuric acid.

It is known that ethylene oxide can be condensed with cyanuric acid in the presence of a basic catalyst to produce 1,3,5-tris(2-hydroxyethyl) isocyanurate.

According to the invention alkylene oxides are condensed with acidic catalyst to produce 1,3,5-tris(2-hydroxyalkyl) isocyanurates. This reaction can be represented as follows:

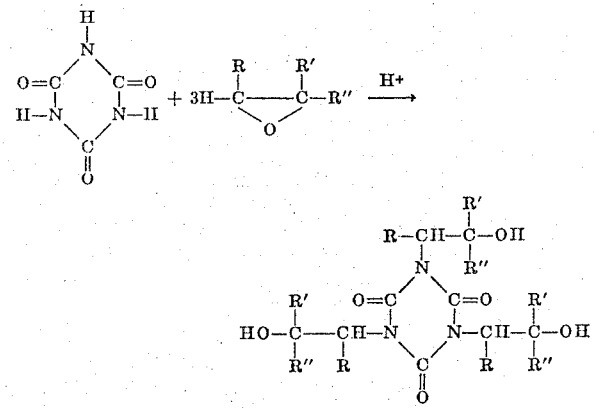

wherein R and R' are hydrogen or lower alkyl radicals and R'' is a lower alkyl or a phenyl radical.

Among the alkylene oxides useful in the first step of the process are propylene oxide, 1,2- and 2,3-butylene oxides, isobutylene oxide, styrene oxide and the like. It is preferred to use the stoichiometric amount of oxide; i.e., three moles per mole of isocyanuric acid. Less yields a mixture of partially oxyalkylated products while more favors the formation of polyoxyalkylene chains.

Suitable acid catalysts for the process include various strong mineral acids, such as sulfuric acid, alkali metal bisulfates, sulfonic acids, hydrochloric acid, hydrobromic acid, phosphoric acid, strong acid ion-exchange resins, and the like. Only a small amount is required, suitable amounts being of the order of 0.1 to 2%, by weight, based on the combined reactants.

Since the reaction of alkylene oxides with cyanuric acid is exothermic, it is preferable, though not essential, to conduct the reaction in an inert solvent, such as dioxane or dimethyl formamide, in order to dilute the reactants and facilitate temperature control.

The following example shows the effect of various catalysts.

Example 1

In each of three experiments, 754 g. of cyanuric acid were dissolved in 4 liters of dimethyl formamide. The solution was placed in a closed reactor and heated to 160° C., after which 945 g. of propylene oxide were slowly pumped in while the temperature was maintained constant. Stirring and heating at 160° were continued for 2 hours, after which the reactor was cooled and the solvent was removed by vacuum distillation. The residue was subjected to high-vacuum distillation, the 1,3,5-tris(2-hydroxypropyl) isocyanurate, if any, distilled at 199° C. (0.6 mm.) while the final residue was essentially cyanuric acid. The reaction mixtures could also be analyzed by infra-red analysis.

The only variable in the above three experiments was the catalyst used, the results being as follows:

| Example | Catalyst | Yield of tris-hydroxypropyl isocyanurate |
|---|---|---|
| 1A | $H_2SO_4$, 1% | 90% |
| 1B | NaOH, 0.8% | 0 |
| 1C | None | 35 |

Example 2

Into a pressure reactor was put 129.1 g. (1 mole) of cyanuric acid, 174.6 g. (3 moles) of propylene oxide, 600 ml. of dimethyl formamide and 2 ml. of 95% sulfuric acid. The vessel was then heated at 170° C. for 30 min., during which time the charge was continuously agitated. The reactor was then cooled and the solvent removed by distillation at 1 mm. pressure. The residue was a very viscous liquid and was shown by infra-red analysis to consist essentially of 1,3,5-tris(2-hydroxypropyl) isocyanurate.

The 1,3,5-tris(2-hydroxyalkyl) isocyanurates of the invention are typical polyols in that they are viscous, neutral liquids having considerable affinity for water. They are useful for most of the purposes for which other polyols are used; e.g., they are readily esterified with monocarboxylic acids to form monomeric esters useful as plasticizers for cellulosic plastics such as ethyl cellulose, cellulose esters and hydroxyalkyl cellulose. They are also readily esterified with dicarboxylic acids to form polyesters resins useful as surface coatings and molding plastics.

By using one of the butylene oxides or styrene oxide instead of the propylene oxide used in the above examples, there is obtained the corresponding ethyl, dimethyl- or phenyl-substituted 2-hydroxyethyl isocyanurate.

By "lower alkyl" as used herein we mean alkyl radicals containing up to about four carbon atoms.

We claim:
1. The process for oxyalkylating cyanuric acid comprising reacting by contacting cyanuric acid with at least three molecular equivalents of an alkylene oxide in the presence of an acid catalyst and at a temperature of about 150° to 200° C.
2. The process defined in claim 1 wherein the alkylene oxide is propylene oxide.
3. The process defined in claim 1 wherein the catalyst is sulfuric acid.
4. The process as defined in claim 1 wherein the reaction is conducted in an inert solvent.
5. The process for making 1,3,5-tris(2-hydroxypropyl) isocyanurate comprising reacting by contacting cyanuric acid with at least 3 molecular equivalents of propylene oxide in the presence of a catalytic amount of sulfuric acid and at a temperature of about 150° to 200° C.

References Cited by the Examiner

UNITED STATES PATENTS

| | | | |
|---|---|---|---|
| 2,716,137 | 8/1955 | Patton | 260—248 X |
| 3,088,948 | 5/1963 | Little et al. | 260—248 |

OTHER REFERENCES

Eastham et al.: Canadian Jour. Chem., vol. 29, (1951), pp. 575–84.

Yurev et al.: Referat. Zhur., Khim (1953), No. 8488.

WALTER A. MODANCE, *Primary Examiner.*

JOHN M. FORD, *Assistant Examiner.*

UNITED STATES PATENT OFFICE
CERTIFICATE OF CORRECTION

Patent No. 3,265,694                                                          August 9, 196

Wilhelm E. Walles

It is hereby certified that error appears in the above numbered patent requiring correction and that the said Letters Patent should read as corrected below.

In the heading to the printed specification, lines 3 and 4, strike out "and James J. Davies, Mount Pleasant, Mich., assignors" and insert instead -- Mich., assignor --.

Signed and sealed this 21st day of November 1967.

(SEAL)
Attest:

Edward M. Fletcher, Jr.                                        EDWARD J. BRENNER Attesting Officer                                                     Commissioner of Patents